United States Patent [19]

Paxton et al.

[11] Patent Number: 4,998,751
[45] Date of Patent: Mar. 12, 1991

[54] TWO-STAGE AUTOMOTIVE GAS BAG INFLATOR USING IGNITER MATERIAL TO DELAY SECOND STAGE IGNITION

[75] Inventors: Donald B. Paxton, Brigham City; Donald R. Lauritzen, Hyrum; Scott R. Anderson, Syracuse, all of Utah

[73] Assignee: Morton International, Inc., Chicago, Ill.

[21] Appl. No.: 498,787

[22] Filed: Mar. 26, 1990

[51] Int. Cl.$^5$ .............................................. B60R 21/10
[52] U.S. Cl. ..................................... 280/741; 280/740
[58] Field of Search ....................... 280/741, 740, 742

[56] References Cited

U.S. PATENT DOCUMENTS

| | | | |
|---|---|---|---|
| 3,880,595 | 4/1975 | Timmerman | 280/741 |
| 4,005,876 | 2/1977 | Jorgensen et al. | 280/741 |
| 4,007,685 | 2/1977 | Nimylowycz | 280/741 |
| 4,013,010 | 3/1977 | Schneiter et al. | 280/741 |
| 4,116,466 | 9/1978 | Gehrig | 280/741 |

Primary Examiner—Kenneth R. Rice
Attorney, Agent, or Firm—Gerald K. White

[57] ABSTRACT

A dual-stage gas bag inflator, operable initially, when activated, to cause the gas bag to deploy slowly and then, after a delay, to deploy rapidly, includes a housing having first and second compartments of different size separated by a bulkhead. The first compartment is the smaller since it is to produce a smaller amount of gas to cause the initial slow deployment of the gas bag. A gas generant charge is ignited in the first compartment, and after some delay, a gas generant charge in the second compartment is ignited. The delay is produced by an initiator including a squib, igniter material in each of the first and second compartments, and a fuse cord which is ignited by the squib. The fuse cord passes through the bulkhead and ignites all igniter materials in both inflator compartments simultaneously. The igniter material in the second compartment is so characterized that it burns slower than the igniter material in the first compartment. When ignited, the igniter material in the first compartment burns outwardly rapidly while that in the second compartment burns outwardly relatively slower. As a result, the gas generant in the first compartment is ignited before the gas generant in the second compartment. The burn rate of the igniter material in the second compartment may be made slower than that in the first compartment by using igniter materials of different chemical composition or by increasing the size of the igniter material, giving it a greater burn area, thus causing it to be consumed slower.

20 Claims, 4 Drawing Sheets

TWO-STAGE AUTOMOTIVE GAS BAG INFLATOR USING IGNITER MATERIAL TO DELAY SECOND STAGE IGNITION

BACKGROUND OF THE INVENTION

1. Field of the Invention

This invention relates to gas generators for inflating vehicle inflatable restraint cushions, commonly known as air or gas bags, to provide impact protection to occupants of the vehicles.

2. Description of the Prior Art

The gas bag is located forward of the occupants and normally is in a deflated condition. In the event of a crash, however, the gas bag is inflated in a matter of a few milliseconds by a gas produced by the burning of a gas generant material in an inflator. The gas generant is ignited by an igniter. The pressure of combustion gases resulting from the rapid burning of the gas generant material causes gas to rush into the bag to effect a rapid rate of inflation thereof.

Figure 1:
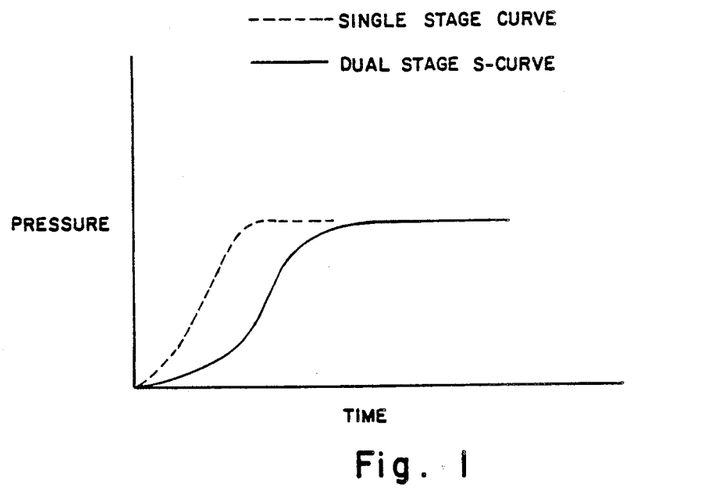
FIG. 1 illustrates a pressure-time comparison of typical automotive gas bag inflators of the prior art.

An out of place child standing in close proximity to a gas bag compartment of an automobile could be injured if all of the gas pressure were released into the bag instantaneously. In order to preclude the possibility of such injury, the bag should initially deploy slowly to gently push the child away. Then, after an appropriate delay, an interval of twenty milliseconds, for example, the bag may be allowed to expand rapidly to protect all passenger seat occupants. A graph of pressure vs. time performance that will produce such an initially gentle but firm gas bag inflating action followed immediately by rapid gas bag inflation is commonly known as an S-curve. Such a curve is illustrated in each of FIGS. 1 and 5.

Several proposals have been made in the prior art to accomplish such performance. In order to establish S-curve parameters, it has been proposed to use a so-called two-stage inflator.

In one such prior art proposal, two driver side inflators are arranged to deploy into a single passenger side gas bag with a time delay between initiation of the initiator of a second one of the inflators after the initiator of a first one thereof has been initiated.

Other proposals have involved two-stage inflators comprising a single inflator housing that has been divided into two chambers or compartments each of which contain combustible gas generant material, and which may be of unequal size. Because a smaller amount of gas is required from the chamber that is first to be ignited, that chamber may be the smaller of the two chambers. When deploying the gas bag, the gas generant material in the first or smaller chamber is ignited, and after some delay, the gas generant material in the second or larger chamber is ignited. Several methods have been proposed for achieving such ignition delay.

As disclosed in U.S. Pat. No. 3,663,035 to Norton, each chamber of a two chamber or two-stage inflator is mounted at one end of a block containing an ignition cavity. This ignition cavity is common to both chambers. A fixed delay line separates one of the chambers from the ignition cavity and delays ignition of that chamber by a few milliseconds.

In U.S. Pat. No. 3,972,545 to Kirchoff et al., which patent is assigned to the assignee of the present invention, a consumable partition is provided in an inflator. The partition divides the inflator into two chambers each of which contains gas generant material that is ignitable by an individually associated initiator or squib. An impact sensor determines whether one or both of the squibs is initiated or fired on collision impact, depending upon the force of the collision, and thus the rate at which the gas bag is to be filled with gas. That is to say, if the impact is less severe, only the first or downstream squib will be fired. In such case combustion proceeds upstream through the consumable partition to fire the squib and the gas generant material in the upstream chamber, thereby to provide a slower rate of inflation for a softer cushioning effect.

U.S. Pat. No. 4,213,635 to Inokuchi et al. discloses an inflator having two gas generating chambers that are separated by a dividing wall. An individually associated igniter is provided for each chamber. Ignition of the igniter in the second chamber is delayed by a signal generator in the first chamber that detects the level of gas pressure therein. When the pressure level reaches a predetermined value, the igniter in the second chamber is ignited.

In U.S. Pat. No. 4,358,998 to Schneiter et al., which patent is assigned to the assignee of the present invention, there is disclosed an igniter assembly for an inflator that is operable to cause the combustible gas generant material in a single combustion chamber to ignite in a progressive manner so as to effect inflation of the gas bag slowly initially but more rapidly later as inflation progresses. The igniter assembly includes a solid propellant disc between two portions thereof whereby the gas generant material disposed around one portion is ignited immediately, and then, after burn through of the disc, the gas generant material disposed around the other portion is ignited. The time required to burn through the disc is the delay time.

Pending U.S. applications for patent bearing application Ser. No. 310,122, filed Feb. 10, 1989 and application Ser. No. 372,994 filed June 29, 1989 by Lauritzen and Ward, which applications are assigned to the assignee of the present invention, each disclose a gas bag inflator comprising an elongated extruded housing having an extruded portion with an intermediate imperforate bulkhead integral with the tubular portion whereby there is provided two isolated chambers. Combustible gas generant means is included in each chamber as is also an individually associated squib. Tailoring of the inflator to the specific needs of a vehicle at the time of a crash may be effected by cutting each end to size after the housing is extruded. The chambers may be provided with different gas generating materials for a softer onset of inflation of the gas bag. Also, some of the common input parameters such as speed and ambient temperature that are monitored by microprocessors in common use in vehicles may be employed to determine the correct time delay in the firing of the individually associated squib in each of the chambers.

A continuation-in-part of U.S. application Ser. No. 310,122 bearing application Ser. No. 409,456, filed on Sept. 22, 1989 by Lauritzen and Ward, and assigned to the assignee of the present invention, contains a similar disclosure.

The foregoing proposals for providing more controlled gas bag inflation that is tailored to the needs of the occupants of a vehicle at the time of a crash have advanced the state of the art. There is, however, a need and a demand for further improvement in reducing the complexity of the inflator ignition delay system, the number of failure modes of the inflator, and the cost of inflator fabrication.

SUMMARY OF THE INVENTION

An object of the invention is to provide an improved dual chamber inflator providing S-curve pressure vs. time performance for vehicle occupant protective gas bags in which ignition of the gas generant material in the dual chambers of the inflator is initiated simultaneously by a single initiator.

Another object of the invention is to provide such a dual chamber inflator wherein a delay in the ignition of the gas generant material in a second one of the chambers, after the gas generant material in a first one of the chambers has been ignited, and the length of such delay, are accomplished by the composition and configuration of the initiator.

A further object of the invention is to provide an inflator comprising an elongated housing, a bulkhead located in said housing at an intermediate position along the length thereof, a pyrotechnic gas generator contained within said housing comprised of first and second gas generating charges of gas generating material extending in end-to-end relation therein with one of said charges being located in one side of said bulkhead and the other charge being located on the other side thereof, and initiator means in said housing comprising first and second igniter tubes associated, respectively, with said first and second gas generating charges for effecting ignition thereof, said igniter tubes having substantially the same diameter and a common longitudinal axis and containing igniter material therein with the igniter material contained in said second igniter tube being characterized to burn at a rate different from the igniter material in the other igniter tube whereby the igniter material in one of said igniter tubes burns outwardly slower than the igniter material in the other igniter tube with the result that there is a delay in the ignition of one of said gas generating charges with respect to the ignition of the other gas generating charge notwithstanding that the igniter materials in both of said igniter tubes are ignited simultaneously, an elongated fuse extending through said bulkhead and located substantially coincident with the axis of each of said igniter tubes, and a single squib positioned adjacent an end of said fuse to initiate burning thereof.

Still another object of the invention is to provide an initiator for the propellant in a two-stage inflator comprising, a first igniter tube, a second igniter tube, the first and second igniter tubes having substantially the same diameter and a common longitudinal axis and containing igniter material therein with the igniter material contained in the second tube being characterized to burn at a rate different from the igniter material in the first igniter tube, the igniter tubes each having a side wall with at least one outlet port therethrough in communication with the igniter material therein, pressure sensitive cover means for the outlet port in each of said igniter tubes, an elongated fuse extending through the igniter tubes and located substantially coincident with the common longitudinal axis thereof, and a single squib positioned adjacent a portion of the fuse to initiate activation thereof.

In accordance with the invention, the initiator includes a squib, a fuse cord and igniter material contained within a suitable elongated two-part housing. The squib is used to ignite the fuse cord which, in turn, is used to ignite the igniter material. The fuse passes through a bulkhead which separates the chambers of a dual chamber inflator, and ignites all igniter materials of the initiator in both housing parts simultaneously. The initiator housing includes a first part or portion that may be operatively positioned with respect to the first or smaller chamber of the inflator and a second and separate part or portion that may be operatively positioned with respect to the second and larger inflator chamber. The delay in ignition of the charge of gas generant material in the second, larger inflator chamber is achieved by having in the second housing portion of the initiator an igniter material that burns slower than the igniter material in the initiator first housing portion. As a result, when the fuse simultaneously ignites the igniter material in both of the first and second initiator housing portions, the igniter material in the first housing portion burns outward at a rapid rate, while the igniter material in the second initiator housing portion burns outward at a relatively slower rate. Therefore, the charge of gas generant material in the smaller of the two inflator chambers is ignited before the charge of gas generant material in the larger inflator chamber.

It is contemplated, in accordance with the invention, that slowing of the burn rate of the igniter material in the second housing portion of the initiator may be accomplished in two ways. One method is to use materials of two different chemical compositions which burn at different rates. The second method is to increase the igniter material size, giving it greater burn area, and causing it to be consumed at a slower rate. Thus, an igniter material in granulated form may be used in the first housing portion of the initiator and the same (or different) igniter material in stranded or pellet form may be used in the second housing portion of the initiator. The granules burn more rapidly than strands or pellets just as a stick burns quicker than a log. An advantage of this method is that the igniter material in both of the first and second portions of the initiator are ignited with the same vigor because both use the same, that is, identical or similar igniter compounds. One of the igniter materials just burns outwardly at a slower rate.

The various features of novelty which characterize the invention are pointed out with particularity in the claims annexed to and forming a part of this specification. For a better understanding of the invention, its operating advantages, and specific objects attained by its use, reference is made to the accompanying drawings and descriptive matter in which a preferred embodiment of the invention is illustrated.

BRIEF DESCRIPTION OF THE DRAWINGS

With this summary of the invention, a detailed description follows with reference being made to the accompanying drawings which form part of the specification, of which.

DESCRIPTION OF THE PREFERRED EMBODIMENTS

Figure 2:
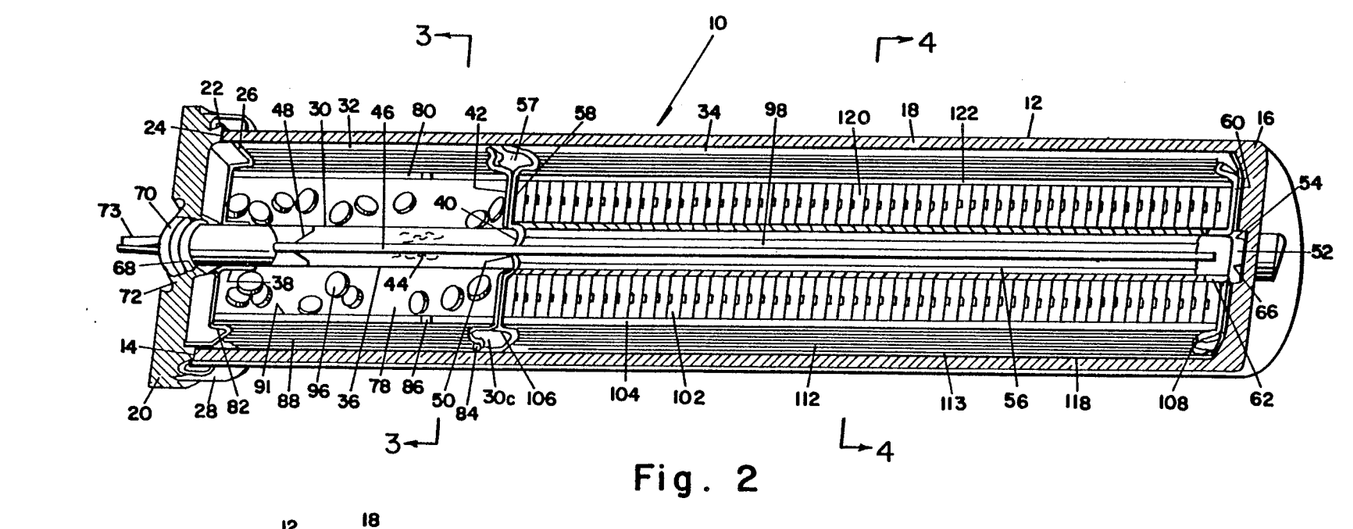
FIG. 2 is a perspective view showing a longitudinal section of a two-stage passenger inflator according to the invention.
Figure 3:
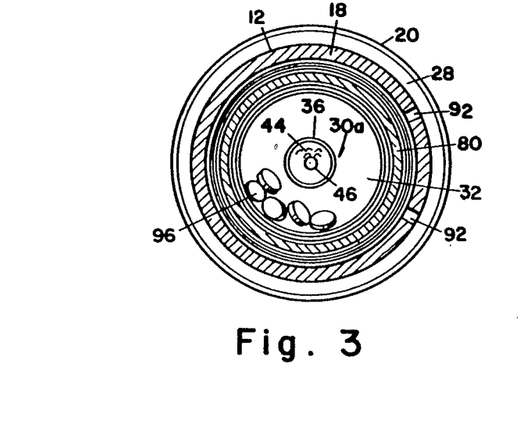
FIG. 3 is a cross sectional view of the inflator of FIG. 2 taken along the lines 3—3.
Figure 4:
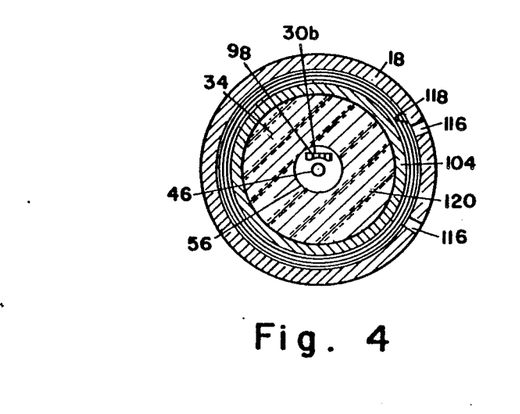
FIG. 4 is a cross sectional view of the inflator of FIG. 2 taken along the lines 4—4.

Referring to FIG. 2, there is shown generally at 10 a gas generator for inflating a vehicle inflatable restraint cushion for the passenger side of a vehicle. The present invention, however, is not meant to be limited to inflators for the passenger sides of vehicles but may also include inflators where appropriate for the driver side. The inflator 10 includes a housing 12 having a first or open end 14 and a second or closed end 16 with a generally tubular or cylindrical elongate portion 18 extending therebetween. Desirably, the closed end 16 of housing 12 is formed integrally with the tubular portion 18, as shown.

The open end 14 of housing 12 is closed by an end plate or base member 20 which is attached thereto in a sealing manner as by a process such as inertia welding, as illustrated by welds 22. A welding process that may be utilized is described in U.S. Pat. No. 4,547,342 to Adams et al., which patent is assigned to the assignee of the present invention and by reference is incorporated herein. Along the periphery of the inner surface thereof, the end plate 20 has a raised circular ridge 24 which is welded to the circular edge of the open end 14 of the housing 12 during the welding process.

In accordance with this process, the inflator 10 is welded in the wholly loaded condition. During the inertia welding operation, the housing 12 and the assembly therein, as described hereinafter, are held stationery in an inertia welding machine. A spring loaded retainer disc or member 26, which may be made of aluminum coated carbon steel or other suitable material, is positioned across the open end 14 of housing 12 to hold the gas generant material and other material contained in the housing 12 in place and to keep them separated from the end plate 20 which is spinning during the inertia welding process. More specifically, the end plate 20 is rotated beneath the loaded housing 12 by power driven clutch means (not shown) to a speed, typically, of about 3000 r.p.m. Upon the attainment of such speed, the clutch is actuated to disconnect the power source and the freely spinning end plate 20 is raised, that is, moved upward to bring the circular ridge 24 of the end plate and the end 14 of housing 12 into physical contact. The resulting friction stops the spinning of the end plate 20 in a fraction of a second but raises the temperature at the areas of contact sufficiently to cause consolidation thereat of the metal of the end plate 20 and the housing 12. Pressure is maintained for a short period, for example, a second or two, to allow the weld 22 to solidify. The weld 22 may also be utilized to hold the retaining disc 26 in place. A protective portion 28 extends from end plate 20 to surround and thereby enclose the weld 22, being spaced slightly from the housing 12.

Figure 5:
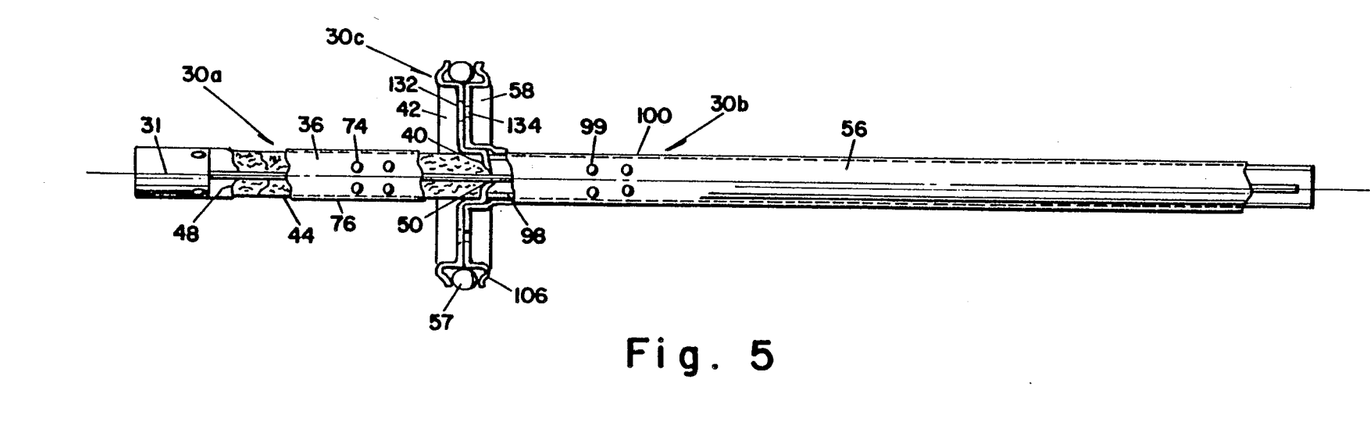
FIG. 5 is a side view, partly in section, showing the first stage bulkhead/igniter tube assembly and the second stage igniter tube of the inflator of FIG. 2.
Figure 6:
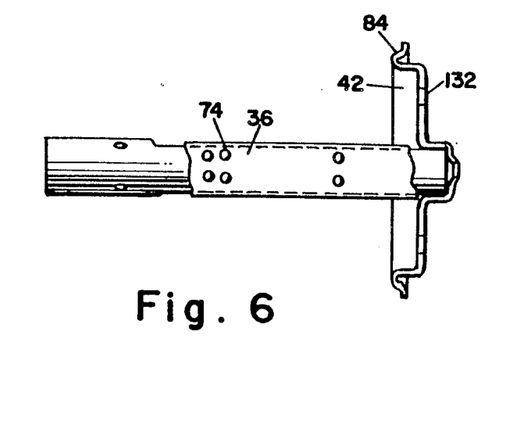
FIG. 6 is a side view showing the first stage igniter tube and associated bulkhead half.
Figure 7:
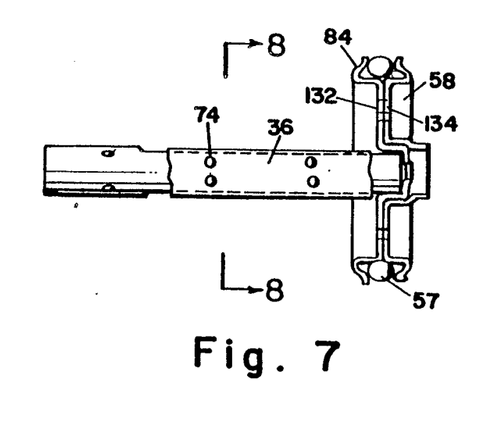
FIG. 7 is a side view showing the first stage bulkhead half/igniter tube assembly and the second stage bulkhead half.
Figure 8:
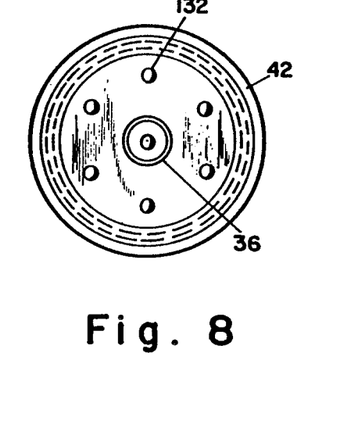
FIG. 8 is a cross sectional view taken along the lines 8—8 in FIG. 7.

Extending generally over the length of the housing 12 and centrally located thereof so as to be generally concentric with the tubular portion 18 is an initiator/bulkhead assembly 30. Initiator/bulkhead assembly 30 includes a first housing portion 30a that is associated with a first cylindrical inflator compartment 32 contained within housing 12 and a second housing portion 30b that is associated with a second cylindrical inflator compartment 34 contained within housing 12. The initiator housing portions 30a and 30b as best seen in FIG. 5, have a common longitudinal axis 31. Compartments 32 and 34 may each have the same diameter but may be of unequal size in respect of volume with the length of the compartment 32 being a third or less than that of compartment 34, as shown in FIG. 2.

Initiator housing portion 30a is positioned in compartment 32, and as shown in FIG. 5, includes an elongated tubular portion having ports or perforations therein and which may be composed of steel or other suitable material and functions as a first igniter tube, designated 36. The longitudinal axis of igniter tube 36 is coincident with the common longitudinal axis 31. Centrally of the retaining disc 26, as shown in FIG. 2, is a flanged portion which extends inwardly of compartment 32 to define a receptacle 38 into which one end of the igniter tube 36 is received. At the other end, the igniter tube 36 is received in a centrally located cup 40 that is formed in a spring loaded disc 42. Disc 42 is positioned in the tubular portion 18 of the housing 12, transversely of the longitudinal axis thereof, and forms half of a bulkhead or barrier, designated 30c, that divides the tubular portion 18 into the first and second compartments 32 and 34, respectively.

Contained within the igniter tube 36 is igniter or pyrotechnic material 44, which may be granular in form, and a centrally positioned elongated fuse or propagation cord 46. At one end, the fuse cord 46 is attached to and held in position by a retaining clip 48. Clip 48 is press fit within the igniter tube 36. The end of the fuse 46 extends slightly beyond the retaining clip 48 toward the end plate 20. The other end of fuse 46 passes through an opening 50 in the disc or bulkhead half 42 into the second portion 30b of the initiator 30, with the other end thereof positioned adjacent to an auto ignition device 52 which is located in a central recess 54 provided on the inner side of the closed end 16 of housing 12.

Initiator portion 30b is positioned in compartment 34, and as shown in FIG. 5, includes an elongated tubular portion 56 which has ports or perforations therein and may be composed of steel or other suitable material and functions as a second igniter tube. The axis of igniter tube 56, similarly to that of igniter tube 36, is coincident with the common longitudinal axis 31. A spring loaded retainer disc 58, which may be made of aluminum coated carbon steel or other suitable material, forms half of the bulkhead 30c. Bulkheaded half 56 is positioned in abutting relation to the other bulkhead half 42 and holds the gas generant material and other material in the second compartment 34 of housing 12 in place including the left end of igniter tube 56, as seen in FIGS.

Figure 9:
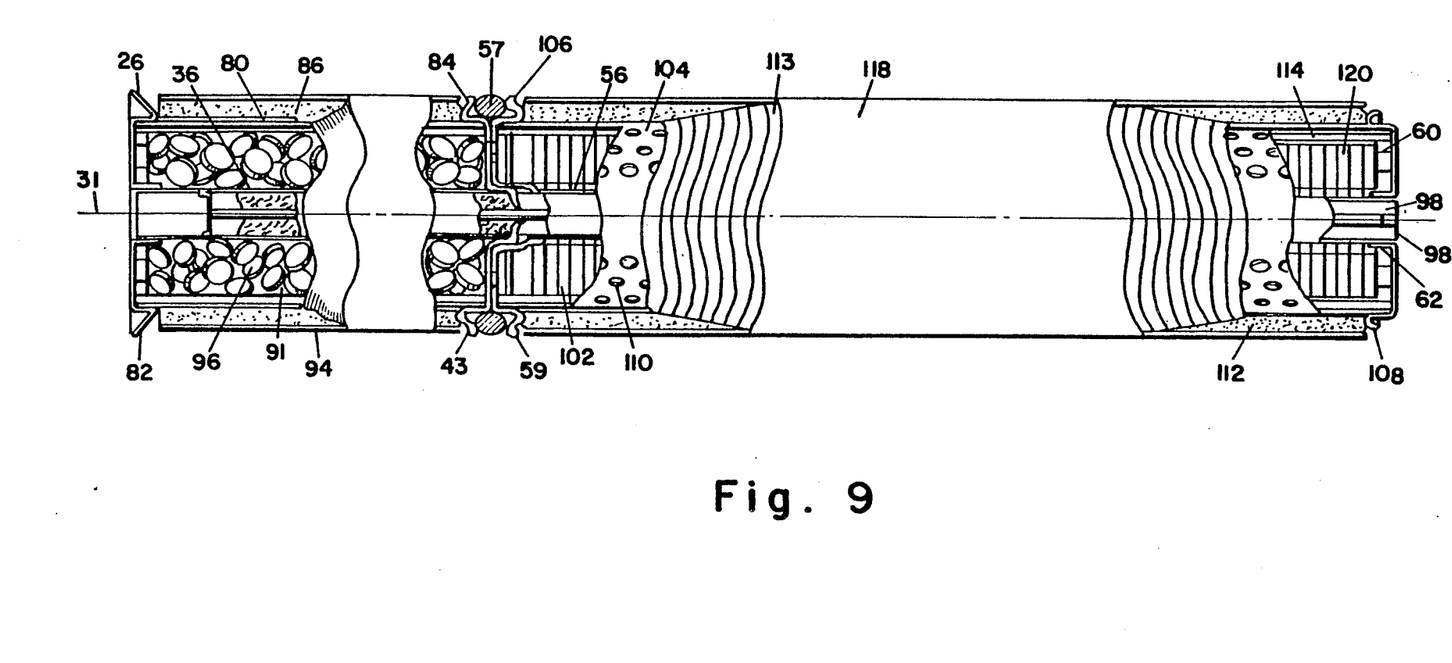
FIG. 9 is a view, partly in section, of the assembled inflator of FIG. 2 excluding the housing thereof.

2 and 9. An annular seal or O-ring 57 of suitable sealing material is provided between offset circular flanges 43 and 59 of bulkhead halves 42 and 58, respectively. Seal 57 precludes the flow of generated gases between compartments 32 and 34 around the circular peripheral edges of the bulkhead 30c.

Positioned adjacent the closed end 16 of housing 12, as seen in FIG. 2, is a spring loaded retainer disc 60, which may be made of aluminum coated carbon steel or other suitable material, to retain the gas generant material and other material at that end of the compartment 34 in place. Centrally of the retaining disc 60 is a flanged portion which extends inwardly of tubular portion 18 of housing 12 to provide a receptacle 62 for the right end of the igniter tube 56, with the fuse 46 extending beyond the end of tube 56 but suitably spaced from the auto ignition device 52.

Auto ignition device 52 contains auto ignition granules 66 and may be similar to the auto ignition device disclosed in U.S. Pat. No. 4,561,675 to Adams et al. and assigned to the assignee of the present invention, the disclosure of which patent is incorporated herein by reference. The granules 66 characterized in being ignitable to cause the charge of gas generant material provided in compartments 32 and 34 to function when the inflator 10 is subjected to a high temperature environment, such as a bonfire, at a temperature in the 350° F. range instead of in the 650° F. range which would cause the pyrotechnics to ignite if there were no auto ignition device. This enables the use of aluminum for the housing 12 of the inflator 10, since aluminum has sufficient strength to contain the internal auto ignition pressures that are produced at 350° F. but not at 650° F. The housing 12 is preferably composed of aluminum in order to minimize weight.

Pressed into an aperture 68 in the outer surface of the base or end plate 20 which closes the open end of housing 12 is a conventional electric squib 70 which is retained therein by a crimp 72 formed in the metal of the end plate 20. The squib 70 is connected by a pair of terminals shown at 73 to electrical lead wires (not shown) which extend outwardly from the end plate 20 to a source of electrical power for initiating ignition of the inflator 10.

Contained within the igniter tube 36 of the first portion 30a of initiator 30 between the retaining clip 26 and the bulkhead 42 is pyrotechnic material 44 which may be any of a variety of compositions meeting the requirements for rapid ignition and non-toxicity. A typical material for this use may be a granular mixture of 25% by weight of boron and 75% of potassium nitrate. This pyrotechnic material 44 is ignitable by fuse 46.

The igniter tube 36 includes a plurality of perforations or outlet ports indicated at 74 for the release of inflation gases resulting from combustion of the pyrotechnic material 44. A pressure sensitive rupturable metal foil 76 which may be composed of aluminum or other suitable rupturable material is sealed to the outer elongated wall of igniter tube 36. The metal foil serves the dual purpose of retaining the granular pyrotechnic material 44 in the perforated igniter tube 36 and of insuring that the high temperature gases produced upon ignition and resulting burning of the pyrotechnic material 44 have sufficient pressure to permeate a gas generant composition provided in the inflator compartment 32, as described in greater detail hereinafter.

The inflator compartment 32 includes a combustion chamber 78 of elongated, generally annular, shape in immediate surrounding relation to the igniter tube 36. The combustion chamber 78 is defined by or contained within an enclosing perforated tube or basket 80 which may be composed of mild steel or other suitable material. Basket 80 is located concentrically relatively to the igniter tube 36 and the tubular portion 18 of housing 12 by means of crimps 82 and 84 provided in retainer disc 26 and bulkhead 42, respectively. Gases flow from the combustion chamber 78 through perforations 86 in the wall of the perforated basket 80 into a space between the perforated basket 80 and the adjacent inner wall of the tubular portion 18 of the housing 12, which space contains a generated gas cooling and filtering assembly generally illustrated at 88.

The filtering assembly 88 is generally annular in cross section and, by way of example but not limitation, may include, beginning with the innermost layer next to the basket 80, two wraps of nickel coated carbon or stainless steel 30 mesh screen, then metal filter such as 80×700 or 50×250 mesh stainless steel or 40×180 mesh nickel coated carbon, then a single wrap of ceramic filter paper 0.080 inches thick, followed by two wraps of 30 mesh stainless steel or nickel coated carbon. A wrap 90 of 5 mesh stainless steel or nickel coated carbon may be provided adjacent the wall of tubular portion 18 to allow space around apertures 92 therein for the free passage of generated gases. In accordance with the invention, however, the cooling and filtering assembly 88 may contain any other suitable arrangement of cooling and filtering components other than that described. Adjacent the inner wall of the perforated basket 80 within the combustion chamber 78 may be disposed two or three wraps of 30 mesh nickel plated carbon or stainless steel cooling screen 91 or other suitable cooling and filtering screen material.

Suitably spaced over the length of the inflator compartment 32 circumferentially of the tubular portion 18 of the housing 12 are a plurality of apertures 92 for the release of generated gas from the combustion chamber 78 into a gas bag (not shown) which is suitably attached thereto. Covering the inside wall of the tubular portion 18 of housing 12 to provide a hermetic or environmental seal is a layer 94 of aluminum foil or other suitable material adhesively applied such as with a thermosetting adhesive and which is rupturable by the gases generated in the combustion chamber 78. The apertures 92 may be positioned over a little less than one-half of the surface circumferentially of the housing 12.

Disposed within the combustion chamber 78 is a combustible gas generating charge of solid pyrotechnic material comprising a plurality of pellets 96 of gas generant material such as shown in the aforementioned U.S. Pat. No. 4,547,342 to Adams et al. The gas generating material may be one of any number of compositions meeting the requirements of burning rate, non-toxicity, and flame temperature. One composition which may be utilized is that described in U.S. Pat. No. 4,203,787 to Schneiter et al. Another composition that may advantageously be utilized is that described in U.S. Pat. No. 4,369,079 to Shaw. Both of these patents, the disclosures of which are incorporated herein by reference, are assigned to the assignee of the present invention.

Contained within the igniter tube 56 of the second portion 30b of initiator/bulkhead assembly 30 between the bulkhead half 58 and the retaining disc 60 at the closed end 16 of the housing 12 is a pyrotechnic material 98. The pyrotechnic material 98 is ignitable by the fuse 46, which fuse, as explained hereinbefore, is also common to the pyrotechnic material 44. In accordance with the invention, the pyrotechnic material 98 is selected to burn radially outwardly of the fuse 46 at a slower rate than that at which the granular mixture of the pyrotechnic material 44 burns radially outwardly therefrom. It is contemplated that the desired slower outward burn rate of the pyrotechnic material 98 may be achieved by utilizing therefor a material of different chemical composition than that employed for the pyrotechnic material 44. When this method is employed, the pyrotechnic material 98 as well as the pyrotechnic material 44 may comprise a granular mixture. It is also contemplated that the desired slower outward burn rate of the pyrotechnic material 98 may be achieved by increasing the physical size thereof, giving it a greater burn area, and causing it to be consumed slower. Thus, the pyrotechnic material 98 may have the same chemical composition as that of the pyrotechnic material 44 but may be in pellet or stranded form, for example. Also, if desired, the chemical composition of the pyrotechnic material 98 may be different from that of the pyrotechnic material 44 as well as being of an increased size with greater burn area. In FIG. 2, the pyrotechnic material 98 is illustrated as being in stranded form. An advantage of using the same or similar compounds for both of the pyrotechnic materials 44 and 98 is that the gas generant materials in both of the inflator compartments 32 and 34 are then ignited with the same vigor. The pyrotechnic material 98 in igniter tube 56 just burns radially outward slower than the pyrotechnic material 44 in igniter tube 36.

The igniter tube 56, similarly to the igniter tube 36, includes a plurality of outlet ports or perforations indicated at 99 for the release of inflation gases resulting from combustion of the pyrotechnic material 98 therein. A pressure sensitive rupturable metal foil 100 of aluminum or other suitable rupturable material is sealed to the outer elongated wall of igniter tube 56. The metal foil serves the dual purpose of retaining the pyrotechnic material 98 in the perforated igniter tube 56 and of insuring that the high temperature gases produced upon ignition and resulting burning of the pyrotechnic material 98 have sufficient pressure to permeate a gas generant composition provided in the inflator compartment 34, as described in greater detail hereinafter.

The inflator compartment 34 includes a combustion chamber 102 of elongated, generally annular, shape in immediate surrounding relation to the igniter tube 56. The combustion chamber 102 is defined by or contained within an enclosing perforated tube or basket 104 which may be composed of mild steel or other suitable material. Basket 104 is located concentrically relatively to the igniter tube 56 and the tubular portion 18 of housing 12 by means of crimps 106 and 108 provided in the retainer discs 58 and 60, respectively. Gases flow from the combustion chamber 102 through perforations 110 in the wall of the perforated basket 104 into a space between the basket 104 and the adjacent inner wall of the tubular portion 18 of housing 12, which space contains a generated gas cooling and filtering assembly generally illustrated at 112.

The filtering assembly 112 is generally annular in cross section and, by way of example, but not limitation, may include, beginning with the innermost layer next to the basket 104, two wraps of nickel coated carbon or stainless steel 30 mesh screen, then metal filter such as 80×700 or 50×250 mesh stainless steel or 40×180 mesh nickel coated carbon, then a single wrap of ceramic filter paper 0.080 inches thick, followed by two wraps of 30 mesh stainless steel or nickel coated carbon. A wrap 113 of 5 mesh stainless steel or nickel coated carbon may be provided adjacent the inner wall of tubular portion 18 to allow space around apertures 116 therein for the free passage of generated gases.

In accordance with the invention, the cooling and filtering assembly 112 may contain other suitable arrangements of cooling and filtering components other than that described. Adjacent the inner wall of the perforated basket 104 within the combustion chamber 102 may be disposed two or three wraps of 30 mesh nickel plated carbon or stainless steel cooling screen 114 or other suitable cooling and filtering screen material.

Suitably spaced over the length of the inflator compartment 34 circumferentially of the tubular portion 18 of the housing 12 are a plurality of apertures 116 for the release of generated gas from the combustion chamber 102 into a gas bag (not shown) which is suitably attached thereto and which preferably, although not necessarily, is the same gas bag into which gases from the inflator compartment 32 flow. Covering the inside wall of the tubular portion 18 adjacent the inflator compartment 34 to provide a hermetic or environmental seal is a layer 118 of aluminum foil or other suitable material adhesively applied such as with a thermosetting adhesive. The layer 118 is rupturable by the gases generated in the combustion chamber 102. The apertures 116 may be of the same size as that of the apertures 92 and may be positioned similarly thereto over a little less than one-half of the surface circumferentially of the housing 12.

Disposed within the combustion chamber 102 is a combustible gas generating charge of solid pyrotechnic material comprising a plurality of wafers 120 of combustible gas generating material which are arranged in a side-by-side array and spaced apart from each other. The wafers 120 may have the shape of washers the inner and outer diameters of which are generally the same as the inner and outer diameters, respectively, of the combustion chamber 102. That is to say, the wafers 120 have substantially the same shape as the cross sectional shape of the combustion chamber 102 taken in a radial plane. The igniter tube 56, as shown in FIG. 2, passes through the central opening of the wafers 120.

The wafers 120, typically, may have a thickness of 0.20 inches, an outer diameter typically of 1.3 to 2.0 inches, and a central hole diameter typically of 0.25 to 0.50 inches which is substantially equal to (but slightly larger than) the outer diameter of the igniter tube 56 whereby the wafers extend from the igniter tube 56 radially outwardly to efficiently fill the combustion chamber 102. The wafers 120 may be stacked to provide a volumetric loading density preferably in the range from 65% to 80% or higher.

A plurality of meshed compressible cushion members 122 may be disposed in alternating relation between the wafers 120 and compressed therebetween. Similarly to the wafers 120, the cushion members 122, have a central opening to allow installation of the igniter tube 56 and have outer and inner diameters approximately equal to the outer and inner diameters, respectively, of the wafers 120. The cushion members 122 may be formed from a screen or other suitable meshed material, for example, 20 to 50 mesh wire screen. The members 122 may be pressed into a wavy or undulating form to provide a cushion effect. The thickness of a formed cushion member 122 may be about 1.5 to 5 times the thickness of the unpressed screen. The array of alternating wafers 120 and cushion members 122 is compressed and held in the combustion chamber between retaining discs 58 and 60.

It should be understood that the present invention is not limited to any particular chemical composition or physical shape of the gas generant materials. A feature of the invention, however, is that the slope of the generated gas pressure versus time curve of the inflator 10, that is, the combined gas pressure output over time of the inflator compartments 32 and 34, may be controlled using gas generant pellets 96 and wafers 120 having the same or similar chemical compositions but different sizes to control the pressure rise rate. This uses the same principle mentioned hereinbefore in connection with the first portion of the initiator to speed or slow gas generant rate. As a result, the shape of the S-curve may be completely controlled by this method of delaying the rate of gas generation in the inflator compartment 34 with respect to the rate of gas generation in the inflator compartment 32.

Functioning of the inflator 10 for each gas generating combustion chamber 78 and 102 begins with an electrical signal from a crash sensor (not shown) through lead wires to the terminals 72 of the electric squib 70 of the initiator 30. When so energized, the squib 70 initiates burning of the fuse 46 which, in turn, effects ignition simultaneously of the granular pyrotechnic material 44 in igniter tube 36 and the pyrotechnic material 98 of stranded form in igniter tube 56.

The gases generated as a result of the rapid burning radially outward of the granular pyrotechnic material 44 burst through the perforations 44 in the wall of the igniter tube 36 and the rupturable foil 76 thereon after the pressure of the hot gases thereon has built up sufficiently to penetrate the plurality of pellets 96 or other gas generant in the combustion chamber 78 in inflator compartment 32. The resultant ignition and burning of the pellets 96 releases inflation gases that flow through the screen 91 which cools and removes some of the particulate residue therefrom, and then flow from the combustion chamber 78 through the perforations 86 in the perforated basket 80. The inflator gases then flow through the filtering assembly 88 which cools and removes particulate residue therefrom, then burst through the aluminum foil 94, exit the inflator 10 through apertures 92 in the tubular portion 18 of housing 12, and flow into a gas bag (not shown) which is connected to the housing 12 and that is to be inflated. Such gas flow causes the gas bag to deploy slowly initially so as to gently push an out-of-position child away without injuring the child.

As mentioned hereinbefore, energization of the squib 70 causes ignition and burning of the pyrotechnic material 98 in igniter tube 56 simultaneously with the ignition and burning of the pyrotechnic material 44 in igniter tube 36. The resultant burning of the pyrotechnic material 98, similarly to that of the granulated pyrotechnic material 44 in igniter 36, is radially outward, but the rate of such burning is slower due to the pyrotechnic material 98 being in stranded form. A longer time is required for the generation of gas in the igniter tube 56 to a pressure that is sufficient to burst through the perforations 99 therein and the rupturable foil 100 thereon and to penetrate and ignite the array of gas generating wafers 120 in basket 104 in the inflator compartment 34. Therefore, the gas generant material 120 in the larger inflator compartment 34 is not ignited until a time subsequent to that at which the gas generating material 96 in the smaller compartment 32 is ignited. Typically, this delay may be of the order of twenty (20) milliseconds. The duration of such delay may be varied, as desired, within limits, by the selection, as previously noted, of the relative physical sizes and burn areas of the gas generant materials in the inflator compartments 32 and 34 and also in the selection of different chemical compositions for the gas generant materials.

Similarly, to the burning of the gas generant pellets 96 in compartment 32, the burning of the gas generant wafers 120 in the compartment 34 releases inflation gases. These inflation gases flow through the screen 114 which cools and removes some of the particulate residue therefrom. The gas then flows from the compartment 102 through the perforations 110 in the basket 104 and through the filtering assembly 112. The filtering assembly cools and removes particulate residue from the gases which then burst through the aluminum foil 118 and exit the inflator 10 through apertures 116 in the wall of the tubular portion 18 of housing 12 to flow into the gas bag (not shown). This flow of gas into the gas bag is in greater volume than that produced as a result of the burning of the gas generant material 96 in compartment 32 of the inflator 10 and causes the gas bag to rapidly expand to protect all of the passenger seat occupants.

A plurality of aligned holes or perforations 132 and 134 in the discs 42 and 58 forming the bulkhead 30c may be provided, as illustrated in FIGS. 5-8, for the purpose of effecting pressurization equalization on the opposite sides thereof and thus preventing the cooling and filtering screens 91 and 114 adjacent the inner walls of the perforated baskets 80 and 84, respectively, from being crushed due to the development of excessive pressure therein. Such crushing of the screens 91 and 114 tends to cause bypass paths through which generated gases containing particulate residue may flow with the result that the gas entering and inflating the gas bag is dirty, containing an undesirable and unacceptable amount of particulate residue.

Figure 10:
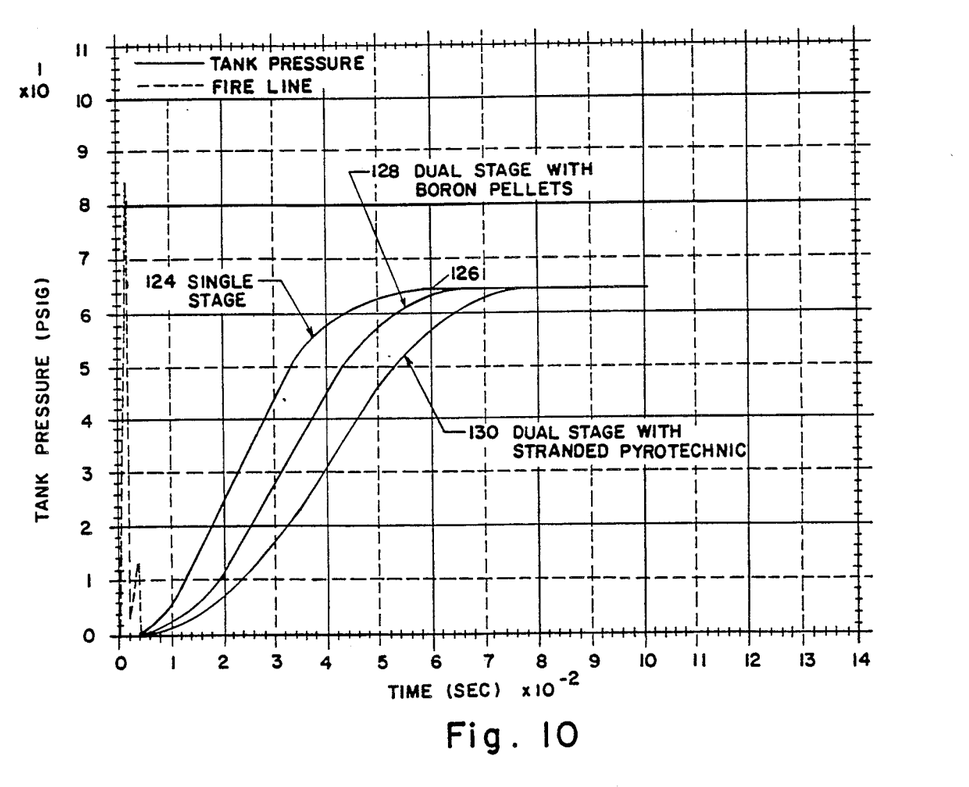
FIG. 10 is a graphical comparison of the pressure vs. time performance of a typical single-stage inflator and two embodiments of a two-stage inflator according to the present invention, with one embodiment using igniter materials composed of boron pellets and the other stranded pyrotechnics.

Referring to FIG. 10, there is shown at 124 a graph of the pressure vs. time performance of a single stage passenger inflator. The pressure rise thereof to full inflation, which is illustrated at 126, is shown to occur at a pressure of about 65 psig at about 60 milliseconds. For such an inflator, it is noted that after only 20 milliseconds the pressure achieved is about 35 psig.

In order to slow such a rapid initial pressure rise to avoid injuring small children and out-of-position occupants during air bag deployment while still achieving full inflation in about 60 milliseconds, the dual chamber inflator 10 of the present invention is provided. The gas generant material 96 in the first compartment 32 is initially fired, and after a predetermined interval, the gas generant material 120 in the second compartment 34 is fired.

Inflator pressure vs. time performance as shown by graphs 128 and 130 is achieved by the use in igniter tube 56 of the initiator 30 of boron pellets and stranded pyrotechnic material, respectively, and the use in igniter tube 36 of granules, with all of the igniter materials being of the same or similar composition. Each of graphs 128 and 130 exhibit S-curve parameters, as mentioned hereinbefore, with the pressure rise of graph 130 being slower initially than that of curve 128 and with the pressure rise of both of the graphs 128 and 130 being slower than that of the graph 124. With respect to graph 128 and 130, it is noted that 20 milliseconds after initiation of ignition the pressure is about 20 psig and 12 psig, respectively. Therefore, the gas bag in each case will deploy initially more slowly than it would if the pressure were 35 psig as in the case of graph 124, with the deployment in the case of graph 130 being slower than that of graph 128.

The dual chamber inflator 10 according to the invention offers a wide range of performance variation. As previously mentioned, the burn rate of the second igniter material, that in igniter tube 56, can be accomplished by two methods, one by using different chemical compositions which burn at different rates, and the other by increasing the igniter material size, giving it greater area, and causing it to be consumed at a slower rate. There is an advantage in the use of the latter method in that when the igniter materials are of the same or similar composition in the igniter tubes 36 and 56, the gas generant materials 96 and 98 in both inflator compartments 32 and 34 are then ignited with the same vigor.

Additionally, it is noted that the pressure vs. time curve may be controlled using different size gas generant pellets 96 and wafers 120 to control the pressure rise rate. This uses the same principle described hereinbefore to slow or speed the rate of gas generation. Therefore, the shape of the S-curve is completely controllable by this method of delay.

By way of illustration and not limitation, it is noted that the composition of the gas generant materials in compartments 32 and 34 of the inflator 10 may comprise 68% sodium azide, 30% molybdenum disulfide and 2% sulfur, with the material in compartment 32 being in pellet form and that in compartment 34 is in stranded form, and the composition of the igniter materials in igniter tubes 36 and 56 may comprise $BKNO_3$, with the material in igniter tube 36 being in granular form and that in igniter tube 56 in stranded form. Typical igniter materials of different composition that may be employed in accordance with the invention comprise granules of $BKNO_3$ in igniter tube 36 and a mixture of nitrocellulose and black powder in stranded form in igniter tube 56.

Thus, in accordance with the invention, there has been provided an improved dual chamber air bag inflator. The inflator is of the radial type having particular utility for use on the passenger side of an automobile, and is capable of providing a controlled delivery of gas to the air bag so as, initially, to cause the gas bag to deploy slowly to gently push an out-of-place child away and then to cause the bag to expand rapidly to protect all passenger seat occupants.

The invention is unique in that both chambers are functioned simultaneously by a single electric squib. The delay and length of the delay are accomplished by the composition and configuration of the igniter materials in the two igniter chambers, which materials are initiated by a single fuse that is activated by the single squib. This arrangement eliminates the cost of having an additional squib and the attendant electrical or electronic circuitry. The invention also reduces the number of failure modes which a double-squib design, or any other mechanical, electrical or pyrotechnic stop-start delay of the ignition system would have.

With this description of the invention in detail, those skilled in the art will appreciate that modifications may be made to the invention without departing from the spirit thereof. Therefore, it is not intended that the scope of the invention be limited to the specific embodiments illustrated and described. Rather, it is intended that the scope of the invention be determined by the appended claims and their equivalents.

What is claimed is:

1. An inflator comprising:
   an elongated housing,
   a bulkhead located in said housing at an intermediate position along the length thereof, said bulkhead having a perforation therein,
   a pyrotechnic gas generator contained within said housing comprised of first and second gas generating charges extending in end-to-end relation therein with one of said charges being located on one side of said bulkhead and the other charge being located on the other side thereof, and
   initiator means in said housing comprising first and second igniter tubes associated, respectively, with said first and second gas generating charges for effecting ignition thereof, each of said igniter tubes having a common longitudinal axis and containing igniter material therein with the igniter material contained in said second igniter tube being characterized to burn at a rate different from the igniter material in the first igniting tube, and an elongated fuse extending through the perforation in said bulkhead and said igniter tubes and positioned substantially coincident with the common longitudinal axis thereof, and a single squib positioned adjacent a portion of said fuse, and operative when fired, to initiate activation of said fuse thereby to effect substantially simultaneous ignition of the igniter material contained in each of said first and second igniter tubes.

2. An inflator as defined by claim 1 wherein said first gas generating charge comprises pyrotechnic material in pellet form and said second gas generating charge comprises pyrotechnic material in wafer form arranged in a side-by-side array.

3. An inflator as defined by claim 2 wherein the chemical composition of the igniter material in said second igniter tube is selected to burn at a rate that is slower than the rate at which the igniter material in the first igniter tube burns.

4. An inflator as defined by claim 2 wherein the igniter material in said first igniter tube is in granular form and the igniter materials in said second igniter tube is in stranded form.

5. An inflator as defined by claim 4 wherein the chemical compositions of the granular and stranded igniter materials in said first and second igniter tubes are substantially identical.

6. An inflator as defined by claim 4 wherein each of said first and second igniter tubes have substantially the same diameter.

7. An inflator as defined by claim 6 further including an auto ignition device for effecting functioning of said inflator when said inflator is exposed to an abnormal high temperature, said auto ignition device being located in a recess at one end of said housing on the longitudinal axis of said igniter tubes, and
   said squib being located at the other end of said housing, with said fuse extending through said first and second igniter tubes and said bulkhead with one end thereof positioned adjacent said squib and the other end thereof positioned adjacent said auto ignition device.

8. A two-stage gas generator for inflating a vehicle inflatable restraint cushion comprising:

an elongated housing including a tubular portion with at least one bulkhead in said tubular portion to provide first and second gas generating compartments therein, said bulkhead having a perforation therein, first and second end portions on said tubular portion, said first end portion being open and said second end portion being closed and formed integrally with said tubular portion, closing means for closing said first end portion of said tubular portion, first and second gas generating means in said first and second gas generating compartments, respectively, and initiator means in said housing comprising first and second igniter tubes associated, respectively, with said first and second gas generating charges for effecting ignition thereof, each of said igniter tubes having a common longitudinal axis and containing igniter material therein with the igniter material contained in said second igniter tube being characterized to burn at a rate different from the igniter material in the first igniter tube, and an elongated fuse extending through the perforation in said bulkhead and said igniter tubes and positioned substantially coincident with the common longitudinal axis thereof, and a single squib positioned adjacent a portion of said fuse, and operative when fired, to effect substantially simultaneous ignition of the igniter material contained in each of said first and second igniter tubes, said tubular portion including aperture means for directing generated gas from each of said first and second compartments to a vehicle inflatable restraint cushion.

9. A two-stage gas generator as defined by claim 8 wherein each of said first and second igniter tubes have substantially the same diameter.

10. A two-stage gas generator as defined by claim 8 wherein said closing means for closing said first end portion of said tubular portion comprises a plate member that is inertia welded to said first end portion of said tubular member.

11. A two-stage gas generator as defined by claim 8 wherein the bulkhead in said tubular member is positioned such that the said second gas generating compartment is longer than the said first gas generating compartment.

12. A two-stage gas generator as defined by claim 8, wherein each of said igniter tubes includes a plurality of outlet ports in the wall thereof, and further including, a pressure sensitive rupturable cover sealed to the outer elongated wall of each of said igniter tubes for insuring that the high temperature gases produced upon ignition and burning of the igniter material therein have sufficient pressure to permeate the first and second gas generating means in first and second compartments in said elongated housing.

13. An inflator as defined by claim 11 wherein said second end portion of said tubular portion of said housing includes an inner recess therein, and further including an auto ignition device for effecting functioning of said inflator when said inflator is exposed to an abnormal high temperature, said auto ignition device being located in said recess in the said closed end of said tubular portion of said housing, said squib being positioned within said closing means for said first end portion of said tubular portion with said elongated fuse extending through said bulkhead and through said igniter tubes with one end positioned adjacent said squib and the other end positioned adjacent said auto ignition device.

14. An inflator as defined by claim 12 further including in each of said first and second gas generating compartments first and second foil seal means, respectively, for sealing the inner wall of said tubular portion of said housing, and further including, separate annular filter means positioned between each of said first and second foil seal means and said first and second gas generating means.

15. An initiator for the gas generating means in a two-stage inflator comprising:

a first igniter tube, a second igniter tube, said first and second igniter tubes having a common longitudinal axis and containing igniter material therein, with the igniter material in said second igniter tube being characterized to burn at a rate different than the igniter material in the first igniter tube, said igniter tubes being separated by a bulkhead having a perforation therein and positioned transversely of the common longitudinal axis thereof, said igniter tubes each having a side wall with at least one outlet port therethrough in communication with the igniter material therein, pressure sensitive rupturable cover means for the outlet port in each of said igniter tubes, an elongated fuse extending through the perforation in the bulkhead and through said igniter tubes and located substantially coincident with the common longitudinal axis thereof, and a single squib positioned adjacent a portion of said fuse to initiate activation thereof.

16. An initiator as defined by claim 15 wherein the igniter material in said first igniter tube is in granular form and the igniter material in said second igniter tube is in stranded form.

17. An initiator as defined by claim 16 wherein the chemical compositions of the granular and stranded igniter materials in said first and second igniter tubes are substantially identical.

18. An initiator as defined by claim 15 wherein said squib is positioned adjacent an end of the fuse at the end of the first igniter tube that is remote from the second igniter tube.

19. An initiator as defined by claim 15 wherein the diameters of said igniter tubes are substantially the same, and wherein the length of said second igniter tube is greater than that of said first igniter tube.

20. An inflator as defined by claim 1 wherein said bulkhead includes a plurality of perforations therein for effecting pressurization equalization on the opposite sides thereof in said housing.

* * * * *